United States Patent [19]

Okado

[11] Patent Number: 4,546,422
[45] Date of Patent: Oct. 8, 1985

[54] CONTROL SYSTEM FOR A VOLTAGE-TYPE INVERTER

[75] Inventor: Chihiro Okado, Fuchu, Japan

[73] Assignee: Tokyo Shibaura Denki Kabushiki Kaisha, Kawasaki, Japan

[21] Appl. No.: 564,677

[22] Filed: Dec. 23, 1983

[30] Foreign Application Priority Data

Dec. 28, 1982 [JP] Japan ................................. 57-228061

[51] Int. Cl.[4] .......................................... H02M 7/537
[52] U.S. Cl. .......................................... 363/41; 363/56;
363/98; 363/132; 363/137; 318/811
[58] Field of Search .............................. 363/41, 56–58,
363/95, 98, 132, 136–138; 318/800–802,
805–806, 811–812

[56] References Cited

U.S. PATENT DOCUMENTS

| 3,967,173 | 6/1976 | Stich | 363/41 X |
| 4,400,656 | 8/1983 | Duis | 318/811 X |
| 4,445,167 | 4/1984 | Okado | 363/56 |

FOREIGN PATENT DOCUMENTS 0068278  6/1981  Japan ................................. 363/98

Primary Examiner—Peter S. Wong
Attorney, Agent, or Firm—Schwartz, Jeffery, Schwaab, Mack, Blumenthal & Evans

[57] ABSTRACT

In a PWM control system for a voltage-type inverter which comprises a bridge connection of electric valves each comprising a reverse parallel connection of a semiconductor switching element and a diode, the direction of the current through each valve is detected, and variation in the output voltage is compensated in accordance with the result of the detection.

10 Claims, 16 Drawing Figures

CONTROL SYSTEM FOR A VOLTAGE-TYPE INVERTER

BACKGROUND OF THE INVENTION

The present invention relates to a control system for a voltage-type inverter comprising a bridge connection of electric valves each comprising a reverse parallel connection of a semiconductor switching element and a diode and converting an DC to an AC power by means of pulse-width modulation control (hereinafter referred to as PWM control).

FIG. 1 shows a conventional system. As shown, DC power from a DC power source 1 is converted to AC power by an iverter bridge 2 and suplied to a load motor 3, which, for the purpose of description, will be assumed to be an induction motor. The inverter bridge 2 comprises a bridge connection of electric valves each comprising a reverse parallel connection of a transistor 21–26 and a diode 31–36.

An inverter frequency setting device 4 provides a frequency reference voltage, which is applied to a ramp function generator 5, which limits the rate of change of the voltage. The output of the ramp function generator 5 is supplied to a voltage pattern circuit or generator 6, and an inverter output voltage pattern outputted by the voltage pattern generator 6 is supplied to an AC voltage reference circuit 8. The output of the ramp function generator 5 is also converted, by a V/F converter (voltage-to-frequency converter) 7, to a frequency proportional to the inverter frequency. The AC voltage reference circuit 8 receives the voltage pattern output and the V/F converter output and produces voltage references $V_U^*$, $V_V^*$, $V_W^*$. An oscillator 9 generates a triangular wave $e_t$ for modulation. Comparators 10, 11, 12 compare the triangular wave $e_t$ with the voltage references $V_U^*$, $V_V^*$, $V_W^*$, respectively to produce PWM outputs, which are amplified by a drive circuit 13 and are used to drive the inverter bridge.

PWM control is well known, but, for an easier understanding of the invention, its fundamentals will be briefly discussed with reference to FIG. 2. Incidentally, today's control system often employs a microprocessor for the PWM operation, but the same principle is applied.

For the sake of simplicity, description is made with reference to one of the phases, e.g., phase U. Similar operations are performed with respect to other phases.

The U-phase reference voltage $V_U^*$, which is sinusoidal, is compared with the triangular wave $e_t$, and a PWM output $PWM_U$ is produced. The fundamental wave of the output $PWM_U$ is proportional to the voltage reference $V_U^*$. PWM control is accomplished by adjusting the magnitude and the frequency of the voltage reference $V_U^*$.

Typical examples of the switching elements used in the inverter bridge are thyristors, transistors, gate-turn-off thyristors (GTO's). These elements have more or less delay in switching, particularly in turn-off. Also, this delay time is not precisely known and can vary depending on various factors. For this reason, it is necessary to take measures for ensuring that, the series connected switching elements, such as the transistors 21 and 24 in FIG. 1 are never concurrently conductive. As one such measure, a dead time is provided so that the transistor 24 is turned on certain time after the transistor 21 is turned off. Further description on this point is given with reference to FIGS. 3 and 4.

FIG. 3 shows, in detail, part of the drive circuit 13 of FIG. 1 which relates to one of the phases, i.e., phase U. The PWM signal $PWM_U$ is passed through an on-delay circuit 132 which delays, by a delay time $T_D$, only the leading edge of the signal pulse. The output signal $V_1$ of the on-delay circuit 132 is amplified by a drive amplifier 134, whose output constitutes a drive signal $V_{21}$ for the transistor 21. The signal $PWM_U$ is also fed to a logic circuit 131, where it is inverted to become a signal $\overline{PWM_U}$, and is then passed through an on-delay circuit 133, similar to the circuit 132. The output signal $V_2$ of the on-delay circuit 133 is amplified by a drive amplifier 135, whose output constitutes a drive signal $V_{24}$ for the transistor 24.

FIG. 4 shows the timing operation. The transistors 21, 24 are turned on and off by the signals $V_1$, $V_2$ whose leading edges are lagging behind $PWM_U$, $\overline{PWM_U}$, respectively, by $T_D$. The turn-on time of the transistors 21, 24 is not more than 1 μsec. and can be neglected. On the other hand, the turn-off time $t_{off}$ of the transistors is several μsec. to several tenths of μsec. To make sure that simultaneous conduction of the series connected transistors 21, 24 is avoided, the on-delay time $T_D$ is set to be two to three times the turn-off time. As a result, there is time interval when the transistors 21, 24 are both non-conductive, and during this time interval, the inverter output voltage is not definite. This point will be described with reference to FIG. 5.

The inverter output voltage $V_{U\text{-}O}$ is a voltage of the inverter U-phase output with reference to a neutral point O which is an imaginary mid-point which results when the DC power source 1 is imaginarily divided into two parts $1_a$ and $1_b$. The inverter output line voltages can be derived, as is well known, from the differences between the voltages $V_{U\text{-}O}$, $V_{V\text{-}O}$, $V_{W\text{-}O}$, i.e., the three output phase voltages on the respective output terminals with reference to the neutral point O.

Now attention is directed to the voltage $V_{U\text{-}O}$ across the inverter U-phase output terminal and the neutral point O. It is assumed that while the load current I is flowing in the direction (hereinafter referred to as the "positive direction") indicated by an arrow of a solid line in FIG. 6, the drive signal $V_{24}$ for the transistor 24 falls (from on to off) at a time point $t_0$. Because of the turn-off time $t_{off}$ of the transistor, the transistor 24 becomes actually non-conductive at a time point $t_1$ ($t_{off}$ after $t_0$). As a result, as shown in FIG. 5(f), the voltage $V_{U\text{-}O}$ is negative until $t_1$. During the period from $t_1$ to $t_2$ when the transistor 21 becomes conductive, the transistors 21, 24 are both non-conductive. If the load current I continues to flow in the direction of the arrow of the solid line, no other circuit but one through the diode 34 is formed so that the terminal U has substantially the same potential as the negative terminal of the DC power source and the voltage $V_{U\text{-}O}$ is kept negative until $t_2$. During the period $t_2$–$t_4$ when the transistor 21 is conductive, the voltage $V_{U\text{-}O}$ is positive. During the period $t_4$–$t_5$ when the transistors 21 and 24 are both non-conductive, the diode 34 becomes conductive again and the voltage $V_{U\text{-}O}$ becomes negative.

When the load current I is flowing in opposite direction, i.e., in the direction (hereinafter referred to as the "negative direction") indicated by an arrow of broken lines, the voltage $V_{U\text{-}O}$ assumes a waveform shown in FIG. 5(g). That is, while the transistors 21, 24 are both non-conductive, the load current I flows through the diode 31 into the DC power source 1 so that $V_{U-O}$ is positive during the period $t_1$–$t_2$ and the period $t_4$–$t_5$.

It is thus seen from FIGS. 5(f), (g) that the output voltage differs depending on the direction of the load current despite the fact that the same voltage is desired and attempted by PWM control.

Now consideration is given to variation of the inverter output voltage in relation to the load current in a situation where the load motor is an induction motor. In FIG. 7 the voltage reference $V_U^*$ is indicated by a solid line while the actual inverter output voltage $V_{U-O}$ is indicated by a broken line. When the induction motor is under no load, the load current is, as shown in FIG. 7(a), lagging by about 90°. Up to 90° (electrical angle) the current is negative, so that the situation is like that of FIG. 5(g) and hence the actual inverter output voltage $V_{U-O}$ is higher (more positive) than the reference $V_U^*$. During the period 90°–180° (electrical angle) the current is positive, so that the situation is like that of FIG. 5(f) and hence $V_{U-O}$ is lower (more negative) than $V_U^*$.

When the induction motor is under full load, the power factor of the load is higher and the larger portion (in terms of time) of the inverter output voltage suffers a decrease, and the average voltage is decreased.

When the induction motor is in regenerative operation, the inverter output voltage is generally increased as shown in FIG. 7(c).

Thus, the inverter output voltage varies depending on the power factor of the load, or the phase of the current relative to the voltage. The amount of variation is substantially fixed regardless of the magnitude of the output voltage. As a result, the voltage regulation (change in the output voltage) is increased. In addition, the output voltage waveform is distorted (away from sinusoidal). Moreover, magnetic flux of the induction motor is varied because of the variation in the inverter output voltage, the operation of the motor is unstable, the efficiency of the motor is lowered because of the distorted current waveform, and torque ripple is increased.

SUMMARY OF THE INVENTION

An object of the invention is to solve the problems discussed above.

Another object of the invention is to provide a control system for a voltage-type inverter with which it is possible to reduce the wave distortion in the inverter output voltage and to reduce the output voltage regulation.

According to the invention, there is provided a control system for a voltage-type inverter which comprises a bridge connection of electric valves each comprising a reverse parallel connection of a semiconductor switching element and a diode, and which converts DC power to AC power by means of pulse-width modulation control, said control system comprising:

a detection device for detecting the direction of current through each valve, and a compensating device for compensating, in accordance with the result of the detection, variation in the voltage which depends on the phase of the output current of the valves.

DETAILED DESCRIPTION OF THE PREFERRED EMBODIMENTS

Figure 1:
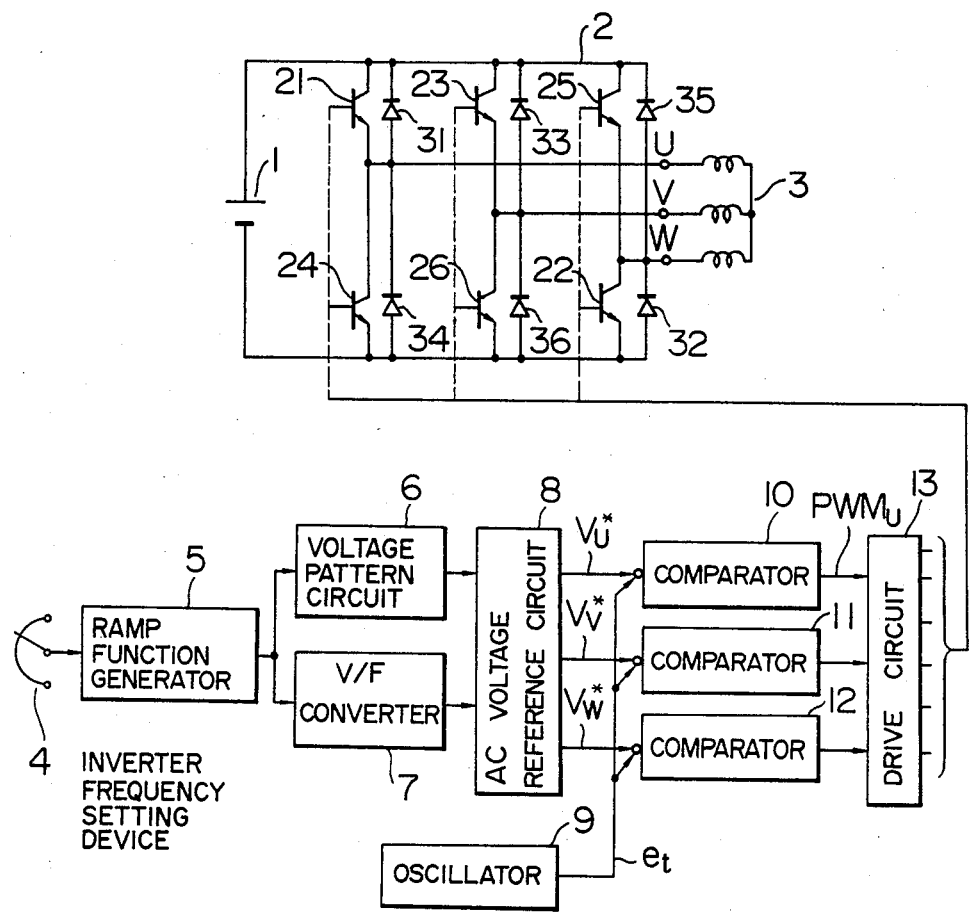
FIG. 1 a diagram showing an inverter with a conventional control system.
Figure 2:
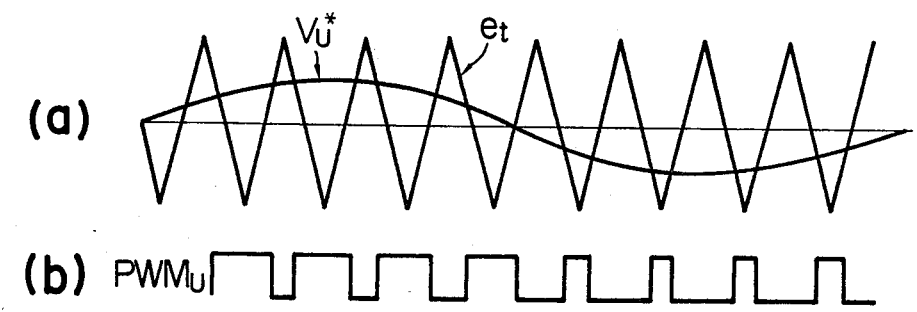
FIGS. 2(a) and 2(b) are time charts used for describing the principle of PWM control.
Figure 8:
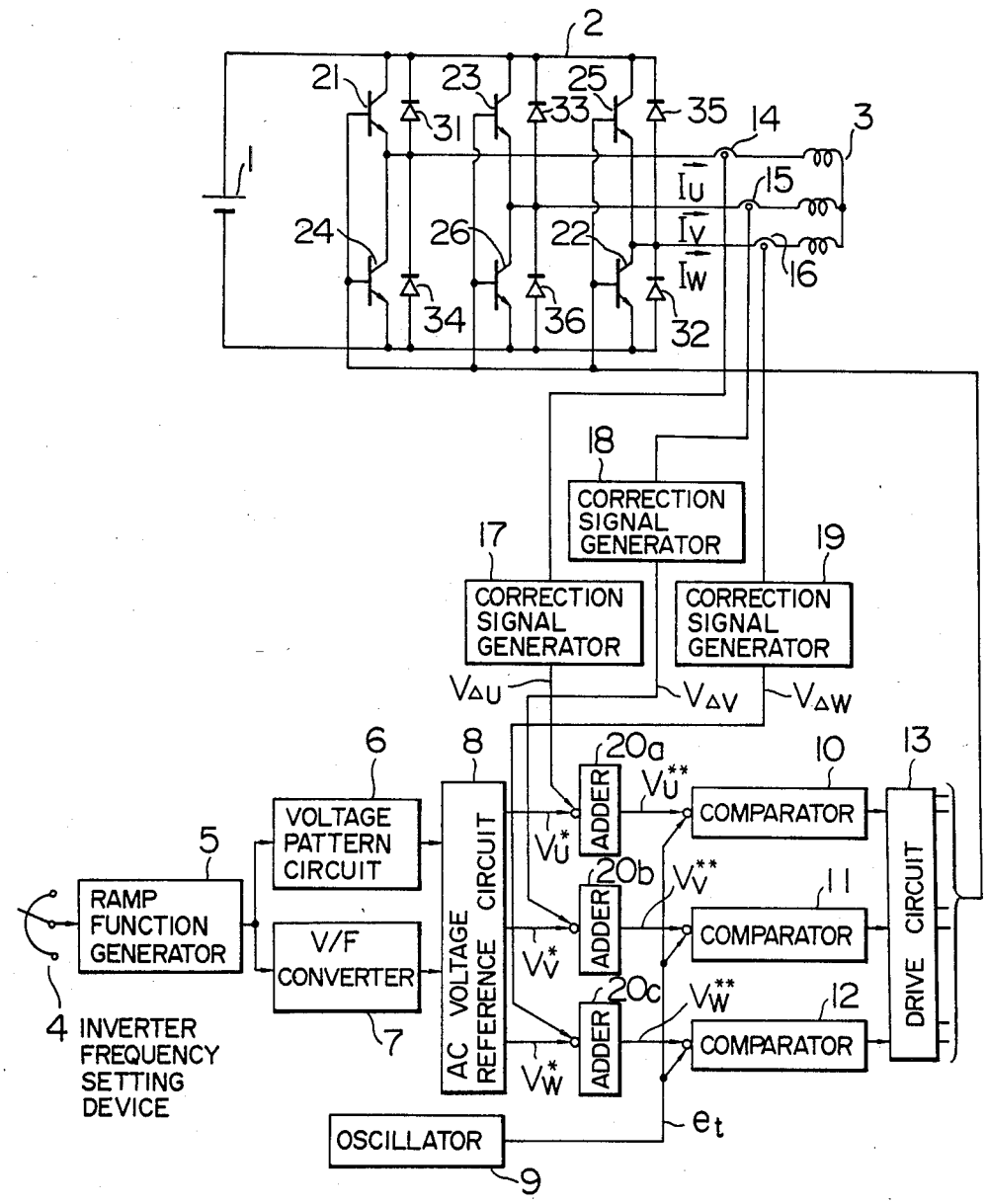
FIG. 8 is a diagram showing an inverter with a control system according to the invention.

FIG. 8 shows an embodiment of the invention. The same reference numerals as in FIG. 1 denote similar devices, and their description is omitted.

Current detectors 14, 15, 16 are provided to detect currents of phases U, V, W, respectively, of the load 3. Correction signal generators 17, 18, 19 are provided to receive the outputs of current detectors and to produce voltage correction signals $V_{\Delta U}$, $V_{\Delta V}$, $V_{\Delta W}$. Adders $20_a$, $20_b$, $20_c$ add the voltage correction signals $V_{\Delta U}$, $V_{\Delta V}$, $V_{\Delta W}$ and the voltage references $V_U^*$, $V_V^*$, $V_W^*$ to produce new or second voltage references $V_U^{}$, $V_V^{}$, $V_W^{}$. The comparators 10, 11, 12 compare the second voltage references $V_U^{}$, $V_V^{}$, $V_W^{}$, instead of $V_U^*$, $V_V^*$, $V_W^*$ (hereinafter called first voltage references) as in the prior art of FIG. 1, with a triangular wave $e_t$ to provide PWM control outputs.

Figure 5:
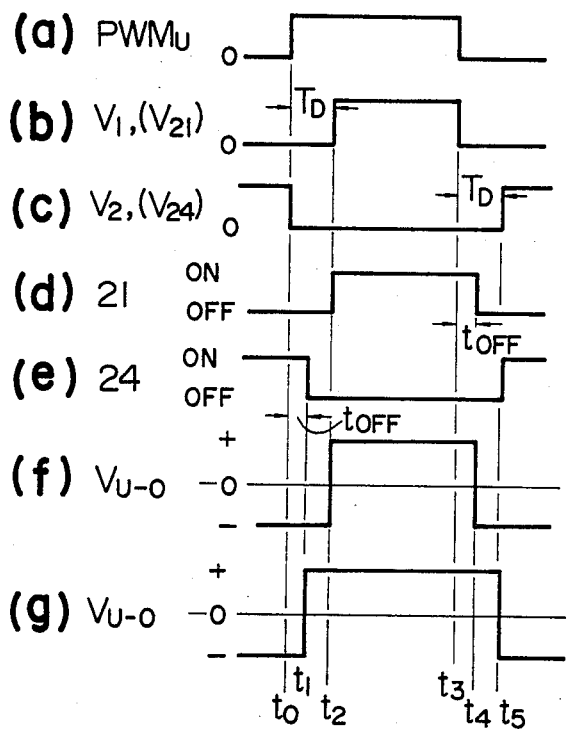
FIGS. 5(a)–5(b) are charts showing operation of transistors.
Figure 6:
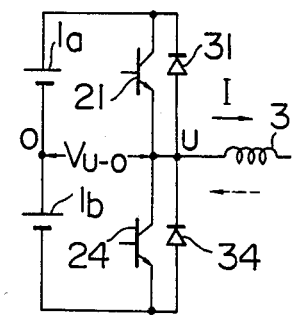
FIG. 6 is a circuit diagram used for describing the relationship between the direction of the load current and the voltage of the output terminal of the inverter.
Figure 3:
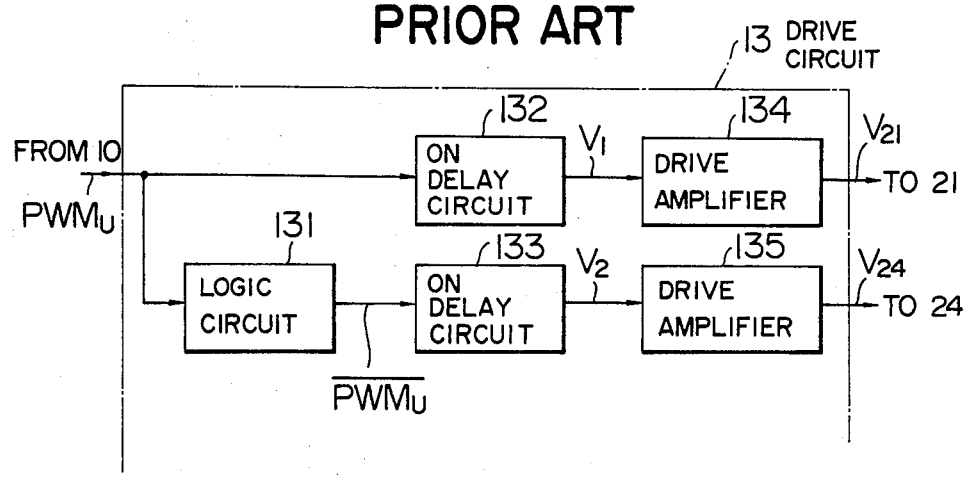
FIG. 3 is a block diagram showing details of an inverter drive circuit.
Figure 4:
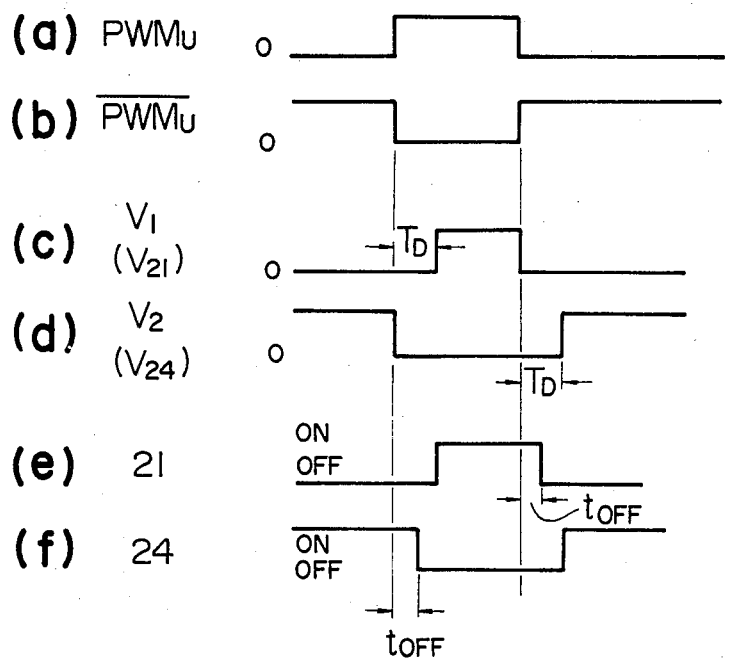
FIGS. 4(a)–4(f) are time charts showing various signals produced in the circuitry of FIG. 3.
Figure 7:
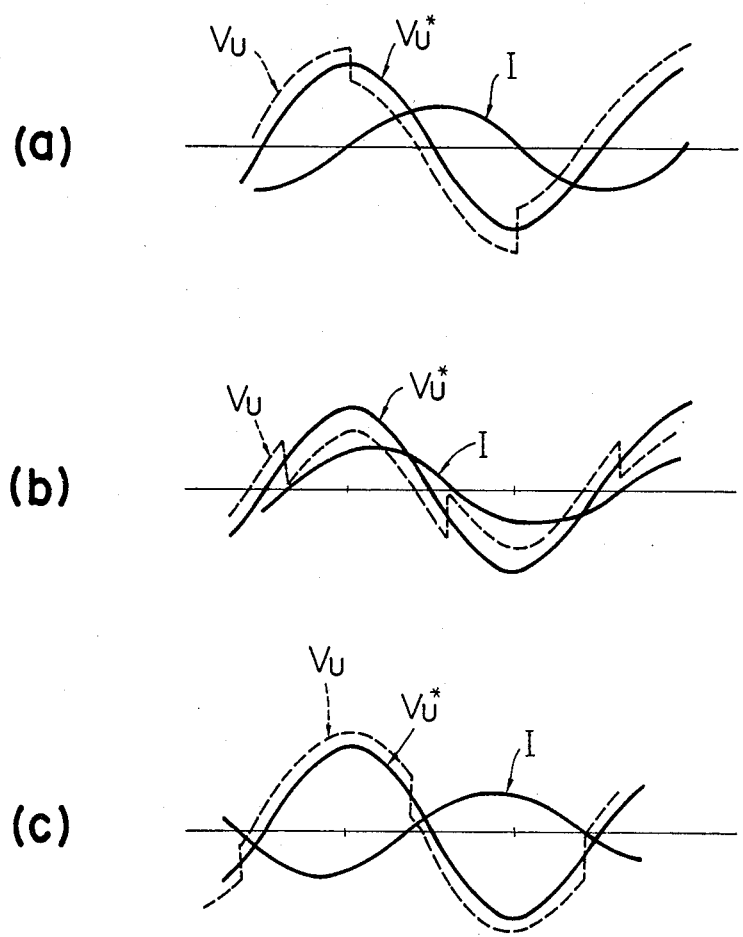
FIGS. 7(a) and 7(c) are diagrams showing how the actual voltage is distorted.
Figure 9:
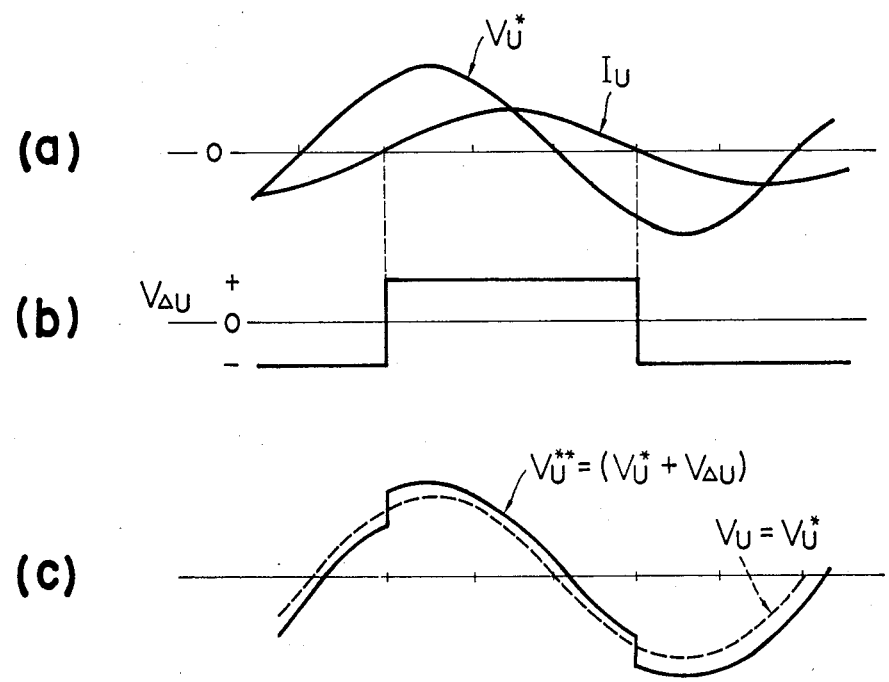
FIGS. 9 (a)–9(c) are diagrams showing how a corrected voltage is formed.

Details of the operation will now be described with reference to FIG. 9. The first voltage reference $V_U^*$ is a desired value of the phase voltage of the induction motor 3. The load current I would be lagging in phase when producing a drive torque. The current detector 14 detects the current $I_U$. The correction signal generator 17 detects the direction or polarity of the current $I_U$ and produces a correction signal $V_{\Delta U}$ which is of a positive value when the current $I_U$ is positive and is of a negative value when the current $I_U$ is negative. The magnitude or absolute value of $V_{\Delta U}$ is selected to be a value proportional to the estimated time length when both transistors 21, 24 are non-conductive. In other words, $V_{\Delta U}$ is selected to be such a value that the new voltage reference $V_U^{**}$ ($=V_U^* + V_{\Delta U}$) results in width of PWM control output pulse a little wider (when the current I is positive) or narrower (when the current I is negative) by the time length of both transistors being non-conductive and hence, the actual time of $V_{U-O}$ being a positive level ($t_2$–$t_4$ in FIG. 5 when the current I is positive or $t_1$–$t_5$ in FIG. 5 when the current I is negative) which corresponds to the desired value $V_U^*$. The second voltage reference $V_U^{**}$ is formed by adding the correction signal $V_{\Delta U}$ and the first reference signal $V_U^*$.

Operation for the phases V and W is similar to that for the phase U.

Thus the invention provides a system wherein the direction or polarity of the load current is detected and is used to modify the PWM control to minimize the wave distortion of the inverter output voltage due to the dead time of a series-connected electric valves of the inverter bridge. The voltage regulation is therefore improved.

In place of the analog type circuit of FIG. 8, digital circuitry or digital computer may be used to perform the PWM control.

In the embodiment of FIG. 8, the direction of the load current is detected by the current detector 14 and the correction signal generator 17 (for the phase U). But the direction of the current can be detected by various other ways such as those shown in and described with reference to FIGS. 10, 12, 14 and 16.

Figure 10:
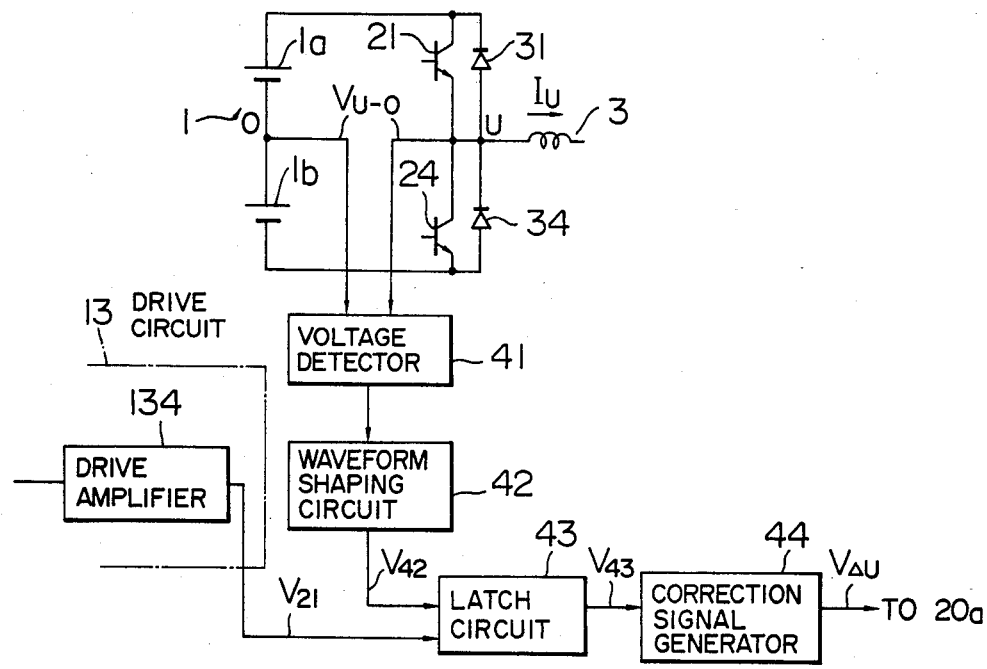
FIG. 10 is a diagram showing an alternative arrangement for detecting the direction of the current.

In the embodiment of FIG. 10, where only part of the system relating to the phase U is illustrated, the DC power source 1 is divided into two parts $1_a$, $1_b$ to provide a mid terminal O. A voltage detector 41 detects the voltage $V_{U-O}$ across the the phase-U terminal and the mid terminal O. A waveform shaping circuit 42 converts the output of the voltage detector 41 to a signal $V_{42}$ (FIG. 11(d)) of a logical level. A latch circuit 43 latches the signal $V_{42}$ at the leading edge of the signal $V_{21}$ (FIG. 11(b)) from the drive circuit 13 and provides an output $V_{43}$ (FIG. 11(e)). A correction signal generator 44 receives the signal $V_{43}$ and produces a correction signal $V_{\Delta U}$ whose phase is opposite to that of the signal $V_{43}$ (FIG. 11(f)). This correction signal $V_{\Delta U}$ is added, in place of that of FIG. 8, to the addder $20_a$ The resultant effect is similar to that described with reference to FIG. 8.

Figure 11:
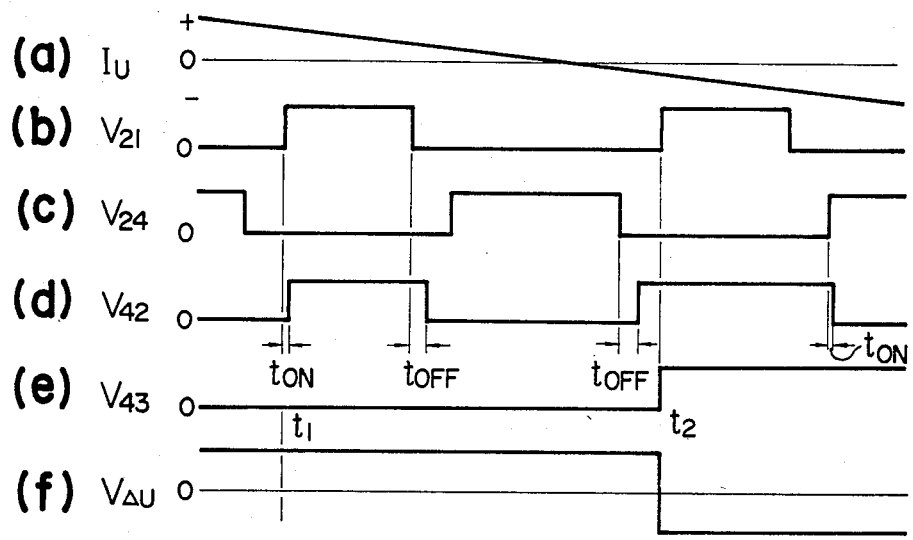
FIGS. 11(a)–11(f) are time charts showing the operation of the arrangement of FIG. 10.

The delay time $t_{on}$ in FIG. 11(d) consists mainly of the on-delay of the transistor 21, but also includes the delay times of the voltage detector 41 and the waveform shaping circuit 42. The total delay time $t_{on}$ is about 2–3 $\mu$sec. On the other hand, the delay time $t_{off}$ consists mainly of the turn-off time of the transistor 21, but also includes the delay times of the voltage detector 41 and the waveform shaping circuit 42. The total delay time $t_{off}$ is about 10–20 $\mu$sec. At the time point $t_1$, the current $I_U$ (FIG. 11(a)) is positive and the signal $V_{42}$ is "0", so that signal "0" is latched as the signal $V_{43}$. At the time point $t_2$, $I_U$ is negative and $V_{42}$ is "1", so that a signal "1" is latched as the signal $V_{43}$. The signal $V_{43}$ is used to produce a signal $V_{\Delta U}$ of the opposite polarity.

Figure 12:
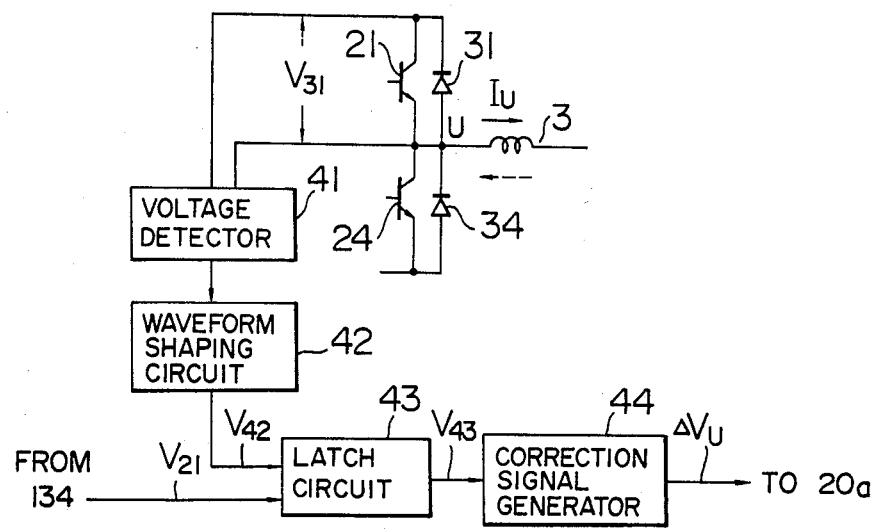
FIG. 12 is a diagram showing another arrangement for detecting the direction of the current.
Figure 13:
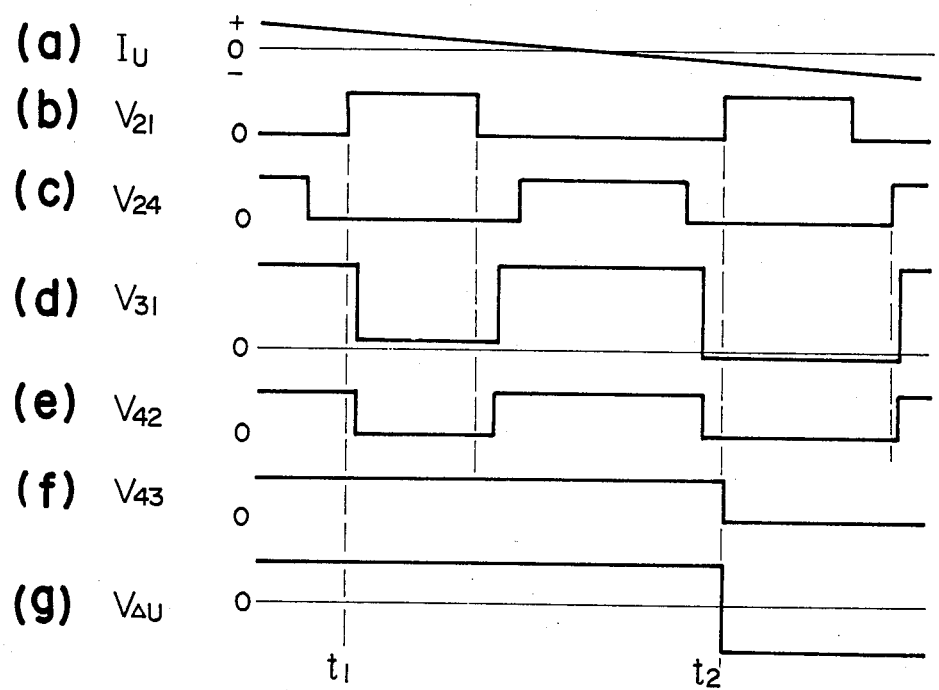
FIGS. 13(a)–13(g) are time charts showing the operation of the arrangement of FIG. 12.

FIG. 12 shows another arrangement for detecting the direction of the current. In this arrangement, the voltage detector 41 similar to that of FIG. 10 is provided to detect the voltage $V_{31}$ across the transistor 21. The output of the voltage detector 41 is processed in turn by the circuits 42, 43, 44 similar to those of FIG. 10. At a time point $t_1$, i.e., a leading edge of $V_{21}$ (FIG. 13(b)), the signal $V_{42}$ (FIG. 13(e)) is latched so that the signal $V_{43}$ (FIG. 13(f)) is "1". At a time point $t_2$, i.e., another leading edge of the signal $V_{21}$, the signal $V_{42}$ is latched so that signal $V_{43}$ is "0". Thus the direction of the current $I_U$ (FIG. 13(a)) is detected and a correction signal $V_{\Delta U}$ (FIG. 13 (g)) is thereby produced.

Figure 14:
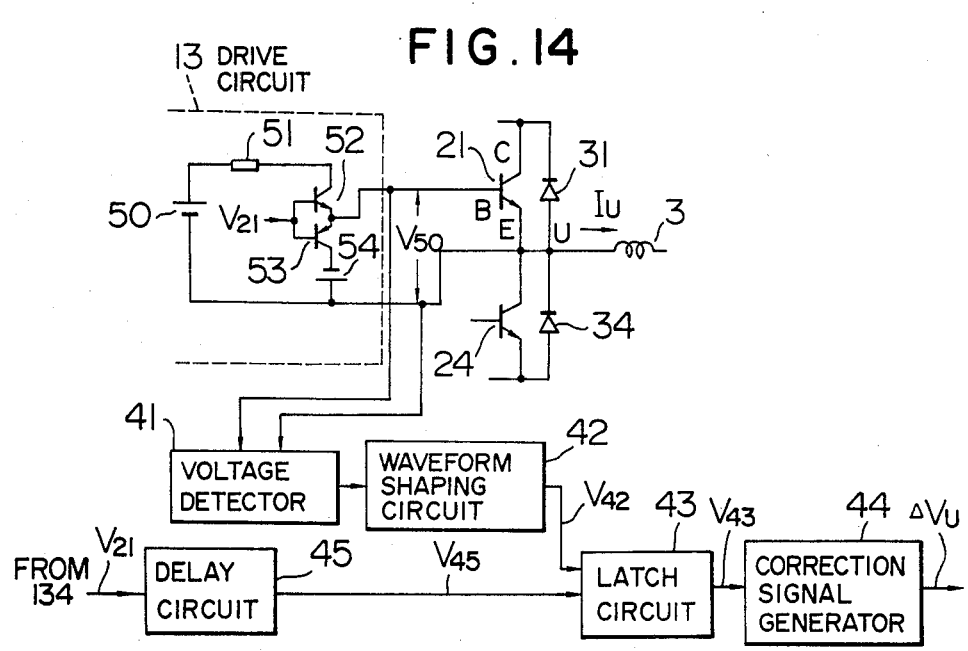
FIG. 14 is a diagram showing a further arrangement for detecting the direction of the current.

FIG. 14 is a further arrangement for detecting the direction of current. In this arrangement, that part of the drive circuit 13 which drives the transistor 21 is formed of a drive power source 50, a resistor 51, transistors 52, 53 and a bias power source 54 connected as illustrated. Base current of the transistor 21 for turning on the transistor 21 is supplied from the drive power source 50, through the resistor 51 and the transistor 52. The bias power source 54 and the transistor 53 are used to apply a bias voltage to the base of the transistor 21 for turning off the transistor 21. The drive signal $V_{21}$ to turn the transistors 52, 53 on and off to control the base current or voltage of the transistor 21. The voltage $V_{50}$ across the base B and the emitter E of the transistor 21 assumes different values depending on whether the current is flowing from the collector C to the emitter E or from the emitter E to the collector C. When the current is flowing from the collector C to the emitter E, the voltage $V_{50}$ is positive and about 0.7–2.0 V. When the current is flowing from the emitter E to the collector C, i.e., through the diode 31, the collector C has a negative potential of about 0.7–1.2 V with reference to the emitter E, and the base current flows from the base B to the collector C (since the transistor 21 is of an NPN type and its base-collector junction acts as a diode). As a result, the voltage $V_{50}$ is negative and about 0.1–0.2 V. By detecting the voltage $V_{50}$ by means of the voltage detector 41, direction of the current is detected.

Figure 15:
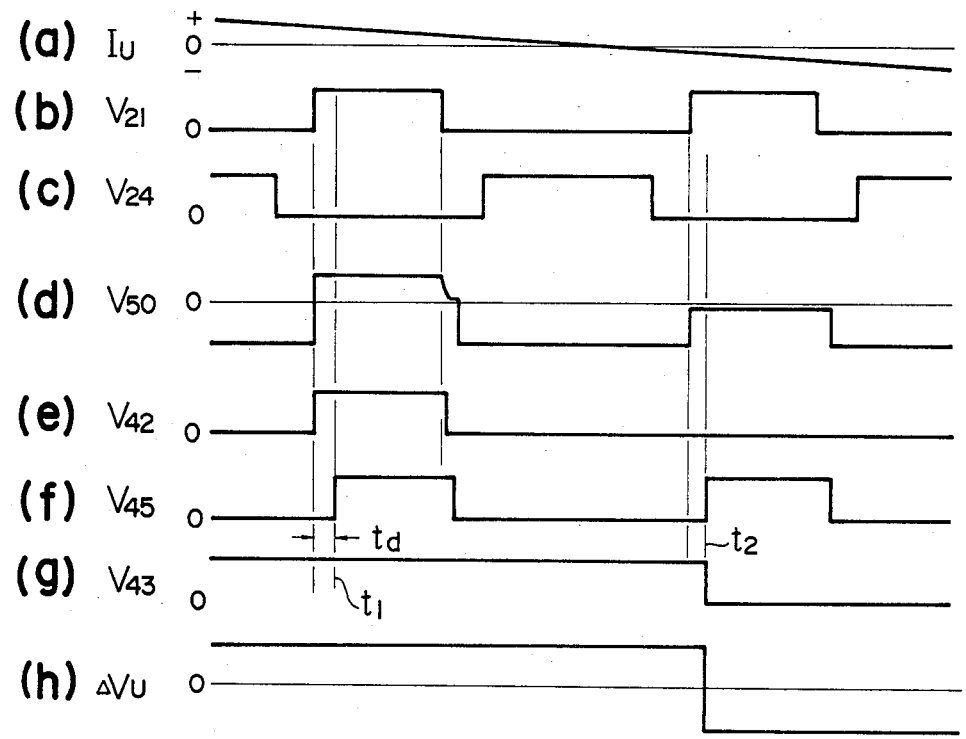
FIGS. 15(a)–15(h) are time charts showing the operation of arrangement of FIG. 14.

The voltage $V_{50}$ (FIG. 15(d)) is slightly delayed from the signal $V_{21}$ (FIG. 15(b)) when the transistor 21 is turned on. The signal $V_{21}$ is passed through a delay circuit 45 to form a delayed signal $V_{45}$ (FIG. 15(f)). This delayed signal $V_{45}$ is used, in place of the signal $V_{21}$, for the latching of the signal $V_{42}$ (FIG. 15(e)). At a time point $t_1$, the current $I_U$ (FIG. 15(a)) is positive so that the signal $V_{50}$ is positive and the signal $V_{42}$ is "1". This signal is latched to form the signal $V_{43}$ of "1". At a time point $t_2$, the current $I_U$ is negative so that the voltage $V_{50}$ is zero or negative and the signal $V_{42}$ is "0". This signal is latched to form the signal $V_{43}$ of "0".

Figure 16:
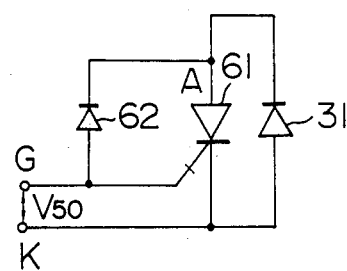
FIG. 16 shows a modification of the electric valve to which the arrangement of FIG. 14 is equally applicable.

The concept of the detection of the direction of the current as shown in FIG. 14 can be equally applied to an inverter bridge whose valves comprise a gate turn-off thyristor (GTO). This is illustrated in FIG. 16, in which a diode 62 is connected in reverse parallel with the gate G and anode A of a GTO 61. Here, the voltage $V_{50}$ across the gate G and the cathode K can be detected and used to determine the direction of the current.

The invention is not limited to the specific elements used in the inverter bridge or the specific commutation method, but is applicable to various types of inverters.

As has been described, according to the invention, the direction of the load current is detected, and the dead band of the series connected switches of the inverter bridge is compensated. By doing so, the voltage regulation is improved and the distortion in the output waveform of the inverter is reduced. When the inverter is used for driving a motor, the operation of the motor is more stable, i.e., the torque ripple is smaller, the load current waveform is closer to sinusoidal, and the efficiency is higher.

What is claimed is:

1. A control system for a voltage-type inverter which comprises a bridge connection of electric valves each comprising a reverse parallel connection of a semiconductor switching element and a diode, and which converts DC power to AC power by means of pulse width modulation control, said control system comprising:

means for generating an AC voltage reference, means for generating a triangular wave signal, means for comparing the AC voltage reference and the triangular wave signal to produce pulse width modulation outputs, a drive circuit responsive to the pulse width modulation outputs for driving the electric valves, the drive circuit including means for ensuring a dead time by which turn-on of one of the electric valves is delayed after turn-off of another electric valve connected in series with said one of the electric valves, detection means for detecting the direction of current through each valve, and compensating means for compensating, in accordance with the result of the detection, variation in an output voltage which depends on the direction of the output current and on the dead time, by modifying the voltage reference in a direction to compensate the variation in the output voltage.

2. A system according to claim 1, wherein said detection means comprises means for detecting the output current of the inverter.

3. A system according to claim 1, wherein said detection means comprises means for detecting the voltage across an output terminal of the inverter and a terminal of a fixed potential, and latching means for latching the detected voltage at the leading edge of an electric valve drive signal.

4. A system according to claim 1, wherein said detection means comprises means for detecting a voltage across the electric valve, and latching means for latching the detected voltage at the leading edge of an electric valve drive signal.

5. A system according to claim 1, wherein said electric valve comprises a transistor and a diode connected in reverse parallel with each other, and said detection means comprises means for detecting the voltage across the base and the emitter of the transistor, and latching means for latching the detected voltage at the leading edge of an electric valve drive signal.

6. A system according to claim 1, wherein said electric valve comprises a GTO and a diode connected in reverse parallel with each other, and another diode connected in reverse parallel with the gate and the anode of the GTO, and said detection means comprises means for detecting the voltage across the gate and the cathode of the GTO and latching means for latching the detected signal at the leading edge of an electric valve drive signal.

7. A system according to claim 1, wherein said compensating means is adapted to correct the voltage reference used for the pulse-width modulation control in accordance with the detected direction of the current.

8. A system according to claim 1, further comprising means for providing a first reference signal indicating the desired value of the output voltage of the inverter, wherein said compensating means comprises means for providing a correction signal having a magnitude corresponding to the time length for which the switching elements of the electric valves connected in series with each other are concurrently non-conductive, and adding means for adding said first reference signal and the correction signal to provide a second voltage reference used for the pulse-width modulation.

9. A system according to claim 8, wherein said correction signal is of a magnitude proportional to the length for which the switching elements of the electric valves connected in series with each other are concurrently non-conductive.

10. A system according to claim 8, wherein said correction signal is of a fixed magnitude and is either positive or negative depending on the direction of the current.

* * * * *